US006236579B1

(12) United States Patent
Watanabe et al.

(10) Patent No.: US 6,236,579 B1
(45) Date of Patent: May 22, 2001

(54) POWER SUPPLY APPARATUS, ITS CONTROL METHOD AND IMAGE FORMATION APPARATUS

(75) Inventors: Michiko Watanabe, Numazu; Hajime Motoyama, Mishima, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/610,225

(22) Filed: Jul. 3, 2000

(30) Foreign Application Priority Data

Jul. 6, 1999 (JP) ........................................ 11-191764

(51) Int. Cl.[7] .......................... H02M 3/335; H02M 7/538
(52) U.S. Cl. .......................................... 363/25; 363/134
(58) Field of Search ............................ 363/15, 16, 24, 363/25, 131, 133, 134

(56) References Cited

U.S. PATENT DOCUMENTS 5,162,981 * 11/1992 Lazar et al. ........................ 363/22
5,654,881 * 8/1997 Albrecht et al. .................... 363/25
5,729,444 * 3/1998 Perol ................................ 363/25
5,895,983 * 4/1999 Motomura ......................... 307/106

* cited by examiner

*Primary Examiner*—Matthew Nguyen
(74) *Attorney, Agent, or Firm*—Fitzpatrick, Cella, Harper & Scinto

(57) ABSTRACT

In a power supply apparatus which supplies a high-tension alternating voltage to a load, field-effect transistors (N-MOS) are disposed between both ends of a converter transformer having a center tap and the ground respectively, and a field-effect transistor (P-MOS) is disposed between the center tap and a power supply. In an ordinary operation, a transistor connected to the center tap is being on and transistors at the both ends of the converter transformer are alternately switched at the same frequency by a converter transformer driving circuit, thereby generating the high-tension alternating voltage on the side of a secondary winding of the converter transformer. When the generation of the high-tension alternating voltage is stopped, the driving circuit is controlled to cause the transistor connected to the center tap to be off and cause the transistors at the both ends of the converter transformer to be on, thereby preventing an unstable output voltage generated when output oscillation is stopped.

6 Claims, 3 Drawing Sheets

POWER SUPPLY APPARATUS, ITS CONTROL METHOD AND IMAGE FORMATION APPARATUS

BACKGROUND OF THE INVENTION

1. Field of the Invention

The present invention relates to a power supply apparatus which outputs a high-tension alternating voltage used in a copying machine, a printer or the like to perform image formation in an electrophotographic method, a control method for the power supply apparatus, and an image formation apparatus which contains the power supply apparatus.

2. Related Background Art

In general, a high-tension alternating voltage might be used in an image formation apparatus such as a copying machine or the like which performs image formation in an electrophotographic method.

FIG. 5 is a circuit diagram showing a structure of a power supply device (a high-tension output device) used in a conventional image formation apparatus. In order to generate the above high-tension alternating voltage, as shown in FIG. 5, a center-tap converter transformer in which a primary winding 302*a* has a center tap is sometimes used.

In FIG. 5, numeral 301 denotes a converter transformer driving circuit, and numeral 302 denotes a center-tap converter transformer (simply referred as a transformer hereinafter). Numeral 303 denotes an output terminal which is connected to a not-shown load used for the image formation. Each of symbols Tr1 and Tr2 denotes an N-channel MOSFET (metal oxide semiconductor field-effect transistor: simply referred as a transistor hereinafter).

The transistors Tr1 and Tr2 are connected to the transformer 302. When the transistors Tr1 and Tr2 are on-off controlled, power is generated at a secondary side of the transformer 302 and then supplied to each load through the output terminal 303.

When control signals (oscillation signals) IN1 and IN2 shown in FIG. 6 are input respectively to gates of the transistors Tr1 and Tr2, these transistors Tr1 and Tr2 perform switching at on/off timing as shown as waveforms of the control signals IN1 and IN2. Thus, when the transistors Tr1 and Tr2 alternately perform the switching, the transformer 302 is excited, and a high-tension alternating voltage according to a turns ratio is generated on the side of a secondary winding 302*b*. The generated voltage is output from the output terminal 303 (a waveform OUT in FIG. 6) to the load.

However, in the above conventional power supply device (the high-tension output device) which uses the center-tap converter transformer, when both the control signals IN1 and IN2 are off, the output oscillation is stopped. Thus, as shown at a part "C" of FIG. 6, at the instant that an operation state changes from a driving state to a stop state, an overshoot or a resonant voltage may occur in an output voltage. This output voltage changes due to the load or floating capacity, thereby generating unstable output voltage.

Thus, there is some fear that this output voltage influences the image formation and thus invites image quality deterioration, whereby there is a problem that a stability of the image quality decreases.

SUMMARY OF THE INVENTION

The present invention was made in consideration of the above-described conventional problem.

An object of the present invention is to provide a power supply apparatus which can prevent an unstable output voltage when output oscillation is stopped, a control method for this power supply apparatus, and an image formation apparatus which contains this power supply apparatus.

A power supply apparatus according to the present invention is the power supply apparatus which supplies a high-tension alternating voltage to a load, comprising:

a converter transformer containing a primary winding and a secondary winding, wherein the primary winding has a center tap to which power is supplied from a power supply;

first and second switching elements disposed between both ends of the converter transformer and the ground respectively;

a third switching element disposed between the center tap and the power supply; and a driving circuit for generating driving signals to cause the first to third switching elements to be on or off respectively, wherein the driving circuit causes the third switching element to be on and causes the first and second switching elements to alternately perform switching at the same frequency, thereby generating the high-tension alternating voltage on the side of the secondary winding of the converter transformer, and when the generation of the high-tension alternating voltage is stopped, the driving circuit is controlled to cause the third switching element to be off and cause the first and second switching elements to be on.

Another power supply apparatus according to the present invention is the power supply apparatus which supplies a high-tension alternating voltage to a load, comprising:

a converter transformer containing a primary winding and a secondary winding, wherein the primary winding has a center tap to which power is supplied from a power supply;

first and second switching elements disposed between both ends of the converter transformer and the ground respectively;

a voltage control element disposed between the center tap and the power supply; and a driving circuit for generating driving signals of the first and second switching elements and the voltage control element, wherein the driving circuit causes the voltage control element to supply a predetermined voltage to the center tap and causes the first and second switching elements to alternately perform switching at the same frequency, thereby generating the high-tension alternating voltage on the side of the secondary winding of the converter transformer, and when the generation of the high-tension alternating voltage is stopped, the driving circuit is controlled to drive the voltage control element to stop supplying the voltage to the center tap and cause the first and second switching elements to be on.

A power supply apparatus control method according to the present invention is the control method for a power supply apparatus which has a converter transformer and supplies a high-tension alternating voltage to a load, in the converter transformer first and second switching elements are disposed between both ends of a primary winding and the ground respectively and a third switching element is disposed between a center tap of the primary winding and a power supply, the method comprising the steps of:

causing the third switching element to be on and causing the first and second switching elements to alternately perform switching at the same frequency, thereby generating the high-tension alternating voltage on the side of a secondary winding of the converter transformer; and causing the third switching element to be off and causing the first and second switching elements to be on, when the generation of the high-tension alternating voltage is stopped.

Another power supply apparatus control method according to the present invention is the control method for a power supply apparatus which has a converter transformer and supplies a high-tension alternating voltage to a load, in the converter transformer first and second switching elements are disposed between both ends of a primary winding and the ground respectively and a voltage control element is disposed between a center tap of the primary winding and a power supply, the method comprising the steps of:

driving the voltage control element to supply a predetermined voltage to the center tap and causing the first and second switching elements to alternately perform switching at the same frequency, thereby generating the high-tension alternating voltage on the side of a secondary winding of the converter transformer; and driving the voltage control element to stop supplying the voltage to the center tap and causing the first and second switching elements to be on, when the generation of the high-tension alternating voltage is stopped.

An image formation apparatus according to the present invention is the image formation apparatus which contains a power supply device having a converter transformer and supplying a high-tension alternating voltage to a load, the converter transformer having a center tap through which power is supplied from a power supply to a primary winding, the apparatus comprising:

first and second switching elements disposed between both ends of the converter transformer and the ground respectively;

a third switching element disposed between the center tap and the power supply; and a driving circuit for generating driving signals to cause the first to third switching elements to be on or off respectively, wherein the driving circuit causes the third switching element to be on and causes the first and second switching elements to alternately perform switching at the same frequency, thereby generating the high-tension alternating voltage on the side of the secondary winding of the converter transformer, and when the generation of the high-tension alternating voltage is stopped, the driving circuit is controlled to cause the third switching element to be off and cause the first and second switching elements to be on.

Another image formation apparatus according to the present invention is the image formation apparatus which contains a power supply device having a converter transformer and supplying a high-tension alternating voltage to a load, the converter transformer having a center tap through which power is supplied from a power supply to a primary winding, the apparatus comprising:

first and second switching elements disposed between both ends of the converter transformer and the ground respectively;

a voltage control element disposed between the center tap and the power supply; and a driving circuit for generating driving signals of the first and second switching elements and the voltage control element, wherein the driving circuit causes the voltage control element to supply a predetermined voltage to the center tap and causes the first and second switching elements to alternately perform switching at the same frequency, thereby generating the high-tension alternating voltage on the side of the secondary winding of the converter transformer, and when the generation of the high-tension alternating voltage is stopped, the driving circuit is controlled to drive the voltage control element to stop supplying the voltage to the center tap and cause the first and second switching elements to be on.

According to the present invention, it is possible to prevent an unstable output voltage which is generated when output oscillation is stopped. Thus, it is also possible to prevent a decrease in stability of image quality due the unstable output voltage.

Other objects and features of the present invention will become apparent from the following detailed description and the attached drawings.

DETAILED DESCRIPTION OF PREFERRED EMBODIMENTS

Hereinafter, the embodiments of the present invention will be explained in detail with reference to the attached drawings.

FIRST EMBODIMENT

Figure 1:
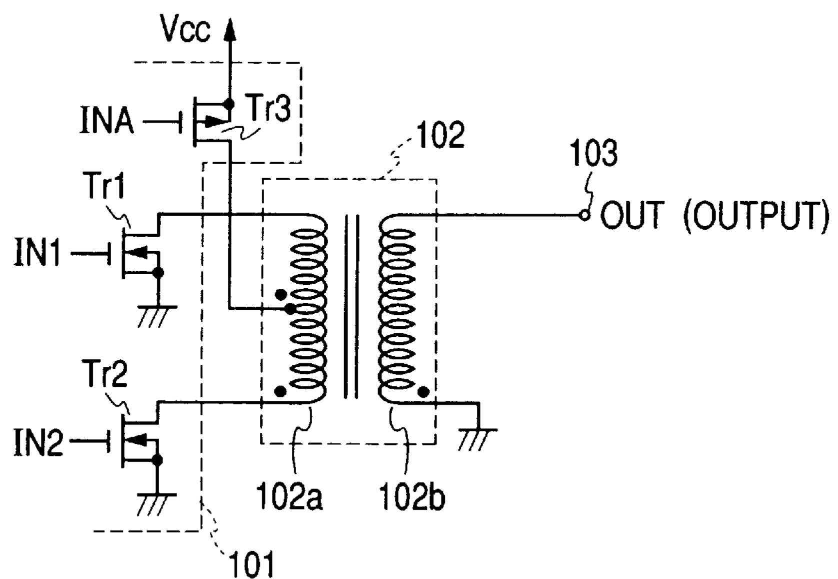
FIG. 1 is a circuit diagram showing a structure of a power supply apparatus according to the first embodiment of the present invention.

FIG. 1 is a circuit diagram showing a structure of a power supply apparatus (a high-tension alternating voltage output apparatus) according to the first embodiment of the present invention. In FIG. 1, numeral 101 denotes a converter transformer driving circuit, and numeral 102 denotes a center-tap converter transformer (simply referred as a transformer hereinafter). Numeral 103 denotes an output terminal which is connected to a not-shown load used for image formation. Symbols Tr1 and Tr2 denote N-channel MOSFET's (metal oxide semiconductor field-effect transistors: simply referred as transistors hereinafter) which act as first and second switching elements respectively. Symbol Tr3 denotes a P-channel MOSFET (simply referred as a transistor hereinafter) which acts as a third switching element.

Respective source terminals of the transistors Tr1 and Tr2 are grounded (GND), and respective drain terminals thereof are connected to both ends of a primary winding 102*a* of the transformer 102. Further, control signals (driving signals) IN1 and IN2 are input to gate terminals of the transistors Tr1 and Tr2 respectively.

The transistor Tr3 is connected between a power supply of which voltage is given Vcc and a center tap of the transformer 102. A drain terminal of the transistor Tr3 is connected to the center tap of the transformer 102, and a source terminal thereof is connected to the power supply (Vcc). Further, a control signal (a driving signal) INA is input to a gate terminal of the transistor Tr3.

Figure 2:
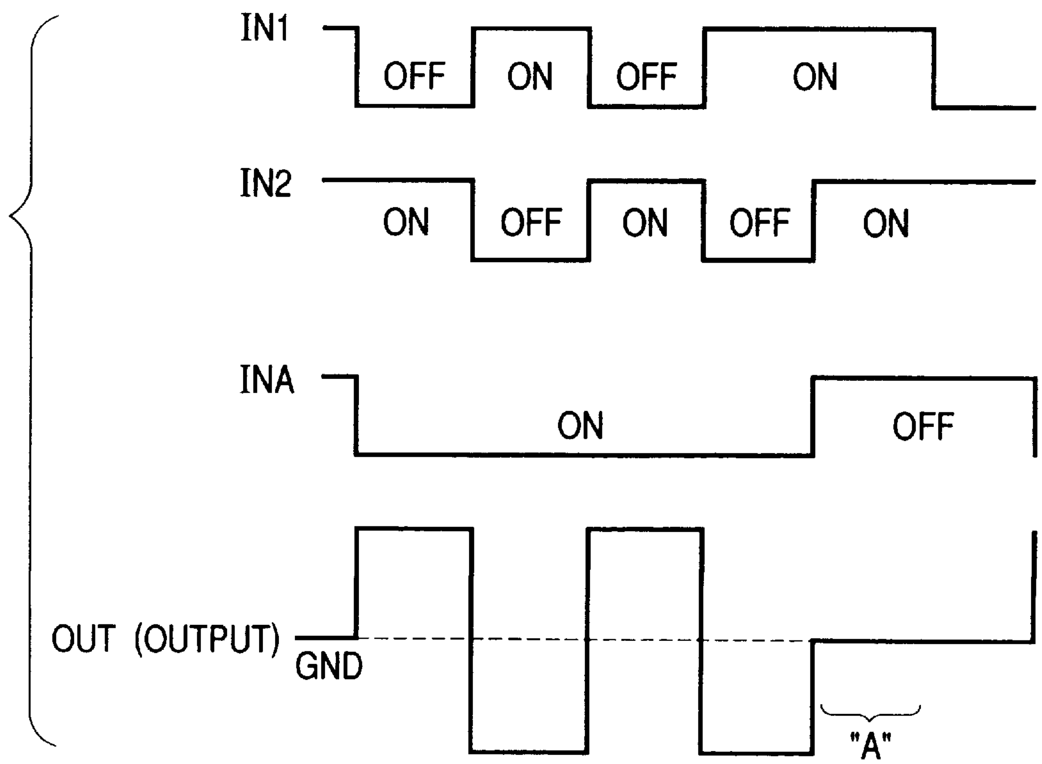
FIG. 2 is a diagram showing control signal waveforms and an output waveform according to the first embodiment of the present invention.

FIG. 2 is a diagram showing control signal waveforms for the above circuit structure and an output waveform of the output terminal 103. In FIG. 2, symbol IN1 also denotes a waveform of the control signal input to the gate terminal of the transistor Tr1, symbol IN2 also denotes a waveform of the control signal input to the gate terminal of the transistor Tr2, symbol INA also denotes a waveform of the control signal input to the gate terminal of the transistor Tr3, and symbol OUT denotes the output waveform of the output terminal 103.

When the control signals (oscillation signals) are input to the gate terminals of the transistors Tr1 and Tr2, these transistors Tr1 and Tr2 perform switching at on/off timing as shown as the waveforms of the control signals IN1 and IN2. At this time, the control signal INA is input to the gate terminal of the transistor Tr3, whereby the transistor Tr3 is turned on. Thus, the power supply voltage Vcc is applied to the transformer 102. Further, when the transistors Tr1 and Tr2 alternately perform the switching at the same frequency, the transformer 102 is excited, and a high-tension alternating voltage according to a turns ratio is generated in a secondary winding 102*b*. The generated voltage is output from the output terminal 103 (a waveform OUT in FIG. 2) to the load.

While the output is stopped, the transistor Tr3 is on in response to the control signal INA, thereby stopping supplying the power supply voltage to the transformer 102. At this time, the control signals IN1 and IN2 are input to the gate terminals of the transistors Tr1 and Tr2 respectively, thereby turning on the transistors Tr1 and Tr2.

By such the operation, the both ends of the primary winding 102*a* of the transformer 102 are short-circuited, and also a magnetic field of the transformer 102 is cancelled. Thus, as shown at a part "A" of FIG. 2, it is possible to eliminate an unstable output voltage especially at the transition from the operation state to the stop state. Therefore, it is possible to eliminate an adverse effect on image formation and thus perform stable and satisfactory image formation.

SECOND EMBODIMENT

Next, the second embodiment of the present invention will be explained with reference to FIGS. 3 and 4.

Figure 3:
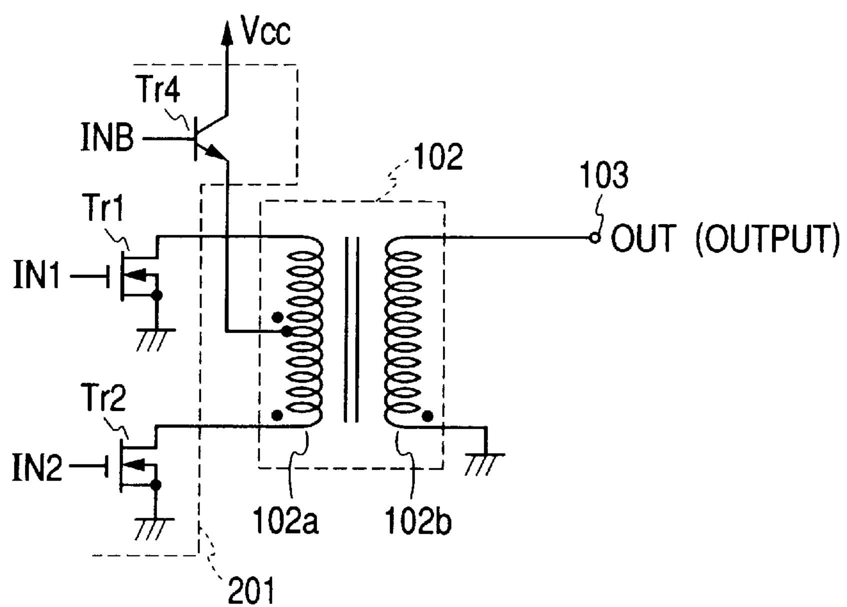
FIG. 3 is a circuit diagram showing a structure of a power supply apparatus according to the second embodiment of the present invention.

FIG. 3 is a circuit diagram showing a structure of a power supply apparatus (a high-tension alternating voltage output apparatus) according to the second embodiment of the present invention. It should be noted that in FIG. 3 elements having the same functions as those in the first embodiment are added with the same reference numerals and symbols respectively.

In FIG. 3, numeral 201 denotes a converter transformer driving circuit, and numeral 102 denotes a center-tap converter transformer (simply referred as a transformer hereinafter). Numeral 103 denotes an output terminal which is connected to a not-shown load used for image formation. Symbols Tr1 and Tr2 denote N-channel MOSFET's (simply referred as transistors hereinafter) which act as first and second switching elements respectively. Symbol Tr4 denotes a bipolar transistor which acts as a voltage control element.

Respective source terminals of the transistors Tr1 and Tr2 are grounded (GND), and respective drain terminals thereof are connected to both ends of a primary winding 102*a* of the transformer 102. Further, control signals (driving signals) IN1 and IN2 are input to gate terminals of the transistors Tr1 and Tr2 respectively.

The transistor Tr4 is connected between a power supply of which voltage is given Vcc and a center tap of the transformer 102. An emitter terminal of the transistor Tr4 is connected to the center tap of the transformer 102, and a collector terminal thereof is connected to the power supply (Vcc). Further, a control signal INB is input to a base terminal of the transistor Tr4.

Figure 4:
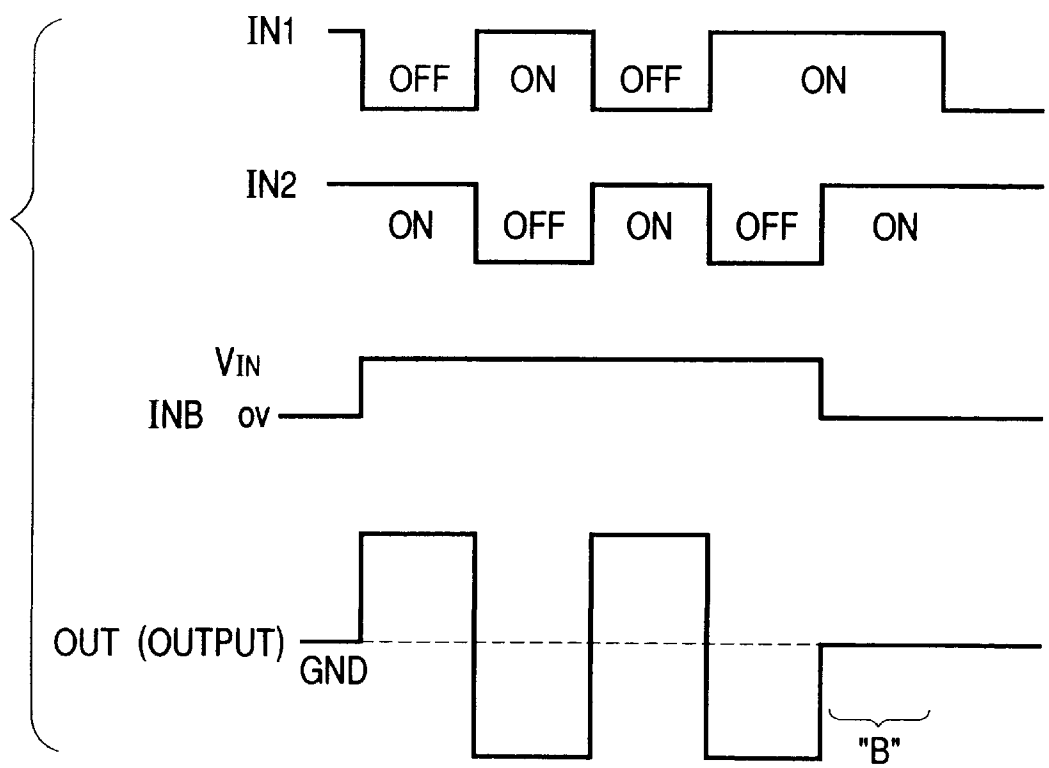
FIG. 4 is a diagram showing control signal waveforms and an output waveform according to the second embodiment of the present invention.
Figure 5:
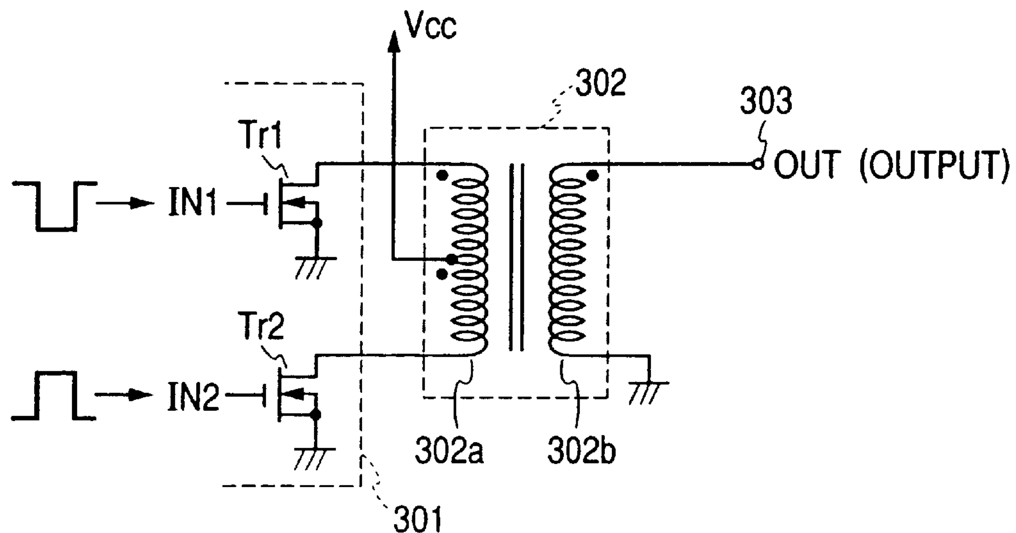
FIG. 5 is a circuit diagram showing a structure of a power supply apparatus in the related background art.
Figure 6:
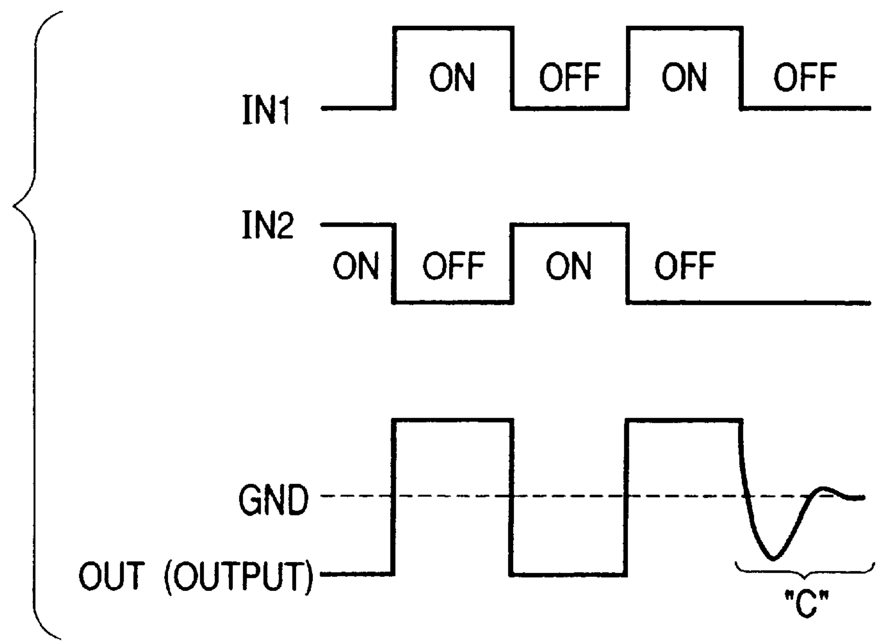
FIG. 6 is a diagram showing conventional control signal waveforms and an output waveform in the related background art.

FIG. 4 is a diagram showing control signal waveforms for the above circuit structure and an output waveform of the output terminal 103. In FIG. 4, symbol IN1 also denotes a waveform of the control signal input to the gate terminal of the transistor Tr1, symbol IN2 also denotes a waveform of the control signal input to the gate terminal of the transistor Tr2, symbol INB also denotes a waveform of the control signal input to the base terminal of the transistor Tr4, and symbol OUT denotes the output waveform of the output terminal 103.

When the control signals (oscillation signals) IN1 and IN2 are input to the gate terminals of the transistors Tr1 and Tr2 respectively, these transistors Tr1 and Tr2 perform switching at on/off timing as shown as the waveforms of the control signals IN1 and IN2. At this time, the control signal INB is input to the base terminal of the transistor Tr4, whereby the transistor Tr4 applies to the transformer 102 a voltage which is decreased by a forward voltage generated between the base and emitter terminals thereof. Further, when the transistors Tr1 and Tr2 alternately perform switching at the same frequency, the transformer 102 is excited, and a high-tension alternating voltage according to a turns ratio is generated in a secondary winding 102*b*. The generated voltage is output from the output terminal 103 (a waveform OUT in FIG. 4) to the load.

While the output is stopped, the transistor Tr4 is off in response to the control signal INB, thereby stopping supplying the voltage to the transformer 102. At this time, the control signals IN1 and IN2 are input to the gate terminals of the transistors Tr1 and Tr2 respectively, thereby turning on the transistors Tr1 and Tr2.

Thus, when the voltage supplied to the center tap is controlled by the transistor Tr4, it is possible to control an amplitude voltage of the output alternating voltage.

Thus, as shown at a part "B" of FIG. 4, it is possible to eliminate an unstable output voltage especially at the transition from the operation state to the stop state and also perform the amplitude voltage of the output alternating voltage, whereby it is possible to obtain further stable output. Therefore, it is possible to perform stable and satisfactory image formation.

As described in the above first and second embodiments, in the power supply apparatus which has the center-tap converter transformer and generates the high-tension voltage output, when the output is stopped, supply of the power supply voltage to the center tap is stopped, and both the ends of the primary winding of the converter transformer are short-circuited to cancel excitation to the converter transformer. Thus, an output impedance at the output stop can be decreased, whereby it is possible to stabilize the output voltage especially at the transition from the output operation state to the stop state.

Although the present invention has been explained by use of the preferred embodiments, the present invention is not limited to these embodiments. Namely, it is obvious that various modifications and changes are possible in the present invention without departing from the spirit and scope of the appended claims.

What is claimed is:

1. A power supply apparatus which supplies a high-tension alternating voltage to a load, comprising:

a converter transformer containing a primary winding and a secondary winding, wherein said primary winding has a center tap to which power is supplied from a power supply;

first and second switching elements disposed between both ends of said converter transformer and the ground respectively;

a third switching element disposed between said center tap and said power supply; and a driving circuit for generating driving signals to cause said first to third switching elements to be on or off respectively, wherein said driving circuit causes said third switching element to be on and causes said first and second switching elements to alternately perform switching at the same frequency, thereby generating the high-tension alternating voltage on the side of the secondary winding of said converter transformer, and when the generation of the high-tension alternating voltage is stopped, said driving circuit is controlled to cause said third switching element to be off and cause said first and second switching elements to be on.

2. A power supply apparatus which supplies a high-tension alternating voltage to a load, comprising:

a converter transformer containing a primary winding and a secondary winding, wherein said primary winding has a center tap to which power is supplied from a power supply;

first and second switching elements disposed between both ends of said converter transformer and the ground respectively;

a voltage control element disposed between said center tap and said power supply; and a driving circuit for generating driving signals of said first and second switching elements and said voltage control element, wherein said driving circuit causes said voltage control element to supply a predetermined voltage to said center tap and causes said first and second switching elements to alternately perform switching at the same frequency, thereby generating the high-tension alternating voltage on the side of the secondary winding of said converter transformer, and when the generation of the high-tension alternating voltage is stopped, said driving circuit is controlled to drive said voltage control element to stop supplying the voltage to said center tap and cause said first and second switching elements to be on.

3. A control method for a power supply apparatus which has a converter transformer and supplies a high-tension alternating voltage to a load, in the converter transformer first and second switching elements are disposed between both ends of a primary winding and the ground respectively and a third switching element is disposed between a center tap of the primary winding and a power supply, said method comprising the steps of:

causing the third switching element to be on and causing the first and second switching elements to alternately perform switching at the same frequency, thereby generating the high-tension alternating voltage on the side of a secondary winding of the converter transformer; and causing the third switching element to be off and causing the first and second switching elements to be on, when the generation of the high-tension alternating voltage is stopped.

4. A control method for a power supply apparatus which has a converter transformer and supplies a high-tension alternating voltage to a load, in the converter transformer first and second switching elements are disposed between both ends of a primary winding and the ground respectively and a voltage control element is disposed between a center tap of the primary winding and a power supply, said method comprising the steps of:

driving the voltage control element to supply a predetermined voltage to the center tap and causing the first and second switching elements to alternately perform switching at the same frequency, thereby generating the high-tension alternating voltage on the side of a secondary winding of the converter transformer; and driving the voltage control element to stop supplying the voltage to the center tap and causing the first and second switching elements to be on, when the generation of the high-tension alternating voltage is stopped.

5. An image formation apparatus which contains a power supply device having a converter transformer and supplying a high-tension alternating voltage to a load, said converter transformer having a center tap through which power is supplied from a power supply to a primary winding, said apparatus comprising:

first and second switching elements disposed between both ends of said converter transformer and the ground respectively;

a third switching element disposed between said center tap and said power supply; and a driving circuit for generating driving signals to cause said first to third switching elements to be on or off respectively, wherein said driving circuit causes said third switching element to be on and causes said first and second switching elements to alternately perform switching at the same frequency, thereby generating the high-tension alternating voltage on the side of the secondary winding of said converter transformer, and when the generation of the high-tension alternating voltage is stopped, said driving circuit is controlled to cause said third switching element to be off and cause said first and second switching elements to be on.

6. An image formation apparatus which contains a power supply device having a converter transformer and supplying a high-tension alternating voltage to a load, said converter transformer having a center tap through which power is supplied from a power supply to a primary winding, said apparatus comprising:

first and second switching elements disposed between both ends of said converter transformer and the ground respectively;

a voltage control element disposed between said center tap and said power supply; and a driving circuit for generating driving signals of said first and second switching elements and said voltage control element, wherein said driving circuit causes said voltage control element to supply a predetermined voltage to said center tap and causes said first and second switching elements to alternately perform switching at the same frequency, thereby generating the high-tension alternating voltage on the side of the secondary winding of said converter transformer, and when the generation of the high-tension alternating voltage is stopped, said driving circuit is controlled to drive said voltage control element to stop supplying the voltage to said center tap and cause said first and second switching elements to be on.

* * * * *